United States Patent
Davidian et al.

(10) Patent No.: US 7,104,407 B2
(45) Date of Patent: Sep. 12, 2006

(54) FLUID SEPARATOR

(75) Inventors: Steven Davidian, Chagrin Falls, OH (US); Christopher Fenn, Hudson, OH (US)

(73) Assignee: Zebra Skimmers Corp., Solon, OH (US)

( * ) Notice: Subject to any disclaimer, the term of this patent is extended or adjusted under 35 U.S.C. 154(b) by 0 days.

(21) Appl. No.: 10/943,730

(22) Filed: Sep. 17, 2004

(65) Prior Publication Data

US 2005/0087488 A1    Apr. 28, 2005

Related U.S. Application Data

(60) Provisional application No. 60/503,781, filed on Sep. 19, 2003.

(51) Int. Cl.
*C02F 1/40* (2006.01)

(52) U.S. Cl. ............... 210/526; 210/540; 210/923

(58) Field of Classification Search ............ 210/242.3, 210/523, 526, 540, 923
See application file for complete search history.

(56) References Cited

U.S. PATENT DOCUMENTS

| | | | | |
|---|---|---|---|---|
| 3,640,394 | A * | 2/1972 | Brill et al. | 210/526 |
| 3,695,451 | A * | 10/1972 | Schmidt et al. | 210/526 |
| 3,709,369 | A * | 1/1973 | Brill et al. | 210/523 |
| 4,274,957 | A * | 6/1981 | Koller | 210/526 |
| 4,876,011 | A * | 10/1989 | Betts et al. | 210/526 |
| 5,062,953 | A * | 11/1991 | Lewan | 210/526 |
| 5,080,781 | A * | 1/1992 | Evins, IV | 210/400 |
| 5,259,958 | A * | 11/1993 | Bronnec et al. | 210/526 |
| 5,474,685 | A * | 12/1995 | Breslin | 210/242.3 |
| 5,645,733 | A * | 7/1997 | Hobson | 210/540 |
| 5,968,354 | A * | 10/1999 | Brinkley | 210/923 |
| 6,887,387 | B1 * | 5/2005 | Hobson | 210/526 |
| 2004/0164014 | A1* | 8/2004 | Rhein et al. | 210/540 |

* cited by examiner

*Primary Examiner*—Christopher Upton
(74) *Attorney, Agent, or Firm*—Pearne & Gordon LLP

(57) ABSTRACT

An apparatus for separating a first fluid from a mixture of fluids in a container, the first fluid being substantially immiscible with respect to one or more other fluids in the mixture comprises an endless strip of material having an affinity for the first fluid, a pair of members for advancing successive portions of the strip into and out of contact with the first fluid and a means for maintaining the successive portions of the strip in contact with the first fluid as the successive portions of the strip are sequentially advanced. The pair of members have cooperating surfaces that positively engage the strip with sufficient force so that movement of the members relative to one another sequentially advances successive portions of the strip. The apparatus can comprise a tube skimmer that is employed to separate tramp oil from a coolant in a machining operation.

7 Claims, 2 Drawing Sheets

FLUID SEPARATOR

Priority based on U.S. Provisional Application No. 60/503,781, filed Sep. 19, 2003, is claimed for this application.

FIELD OF THE INVENTION

The present invention relates generally to an apparatus for separating fluids and, more specifically, to an apparatus for removing tramp oil from coolants used in machining centers.

BACKGROUND OF THE INVENTION

There are a variety of instances where it is desired to separate a fluid from a mixture of fluids. For example, in many machining operations, an aqueous coolant is sprayed or flowed at the location where a cutting tool engages the workpiece for lubrication and cooling purposes. The coolant is then collected in a tank and recycled for continuous use for as long as possible. Aqueous coolants of this type are fairly expensive. Consequently, it is advantageous to maintain such coolants in a usable condition for as long as possible. Typical machining operations also employ lubricating oils for lubricating moving parts. Eventually, the lubricating oils drip or flow into the tank where the aqueous coolant is being collected. In the tank, the lubricating oils float upon the surface of the coolant because they are of a lighter weight and lower density than the coolant. These lubricating oils, typically referred to as "tramp oil," eventually contribute to bacterial growth within the tank holding the aqueous coolant, resulting in a foul odor and reducing the useful life of the aqueous coolant. Moreover, due to environmental considerations, the oil-contaminated aqueous coolant must be treated as a hazardous waste and its disposal represents an environmental and economic concern.

A number of separating, or skimming, devices have been developed over the years to remove tramp oil from the surface of an aqueous coolant held in a tank associated with a machining operation. One type of such device is a disk skimmer that includes a disk which extends into contact with the tramp oil that has collected on top of the aqueous coolant. Rotation of the disk adjacent the surface of the fluids in the tank results in removal of the tramp oil from the tank. The tramp oil is scraped from the disk by a blade, collected and removed. Belt skimmers also are used. Such skimmers employ an endless belt which removes the tramp oil from the surface of the aqueous coolant. As with the disk skimmers, the tramp oil is scraped from the belt, collected and removed.

Tube skimmers also are available for removing tramp oil from the surface of an aqueous coolant. A tube skimmer can be mounted to the side of the tank containing the tramp oil and coolant and involves running an endless, flexible, small diameter tube into the tramp oil at the surface of the coolant. The tube collects the tramp oil on its outer surface and brings the tramp oil to a scraper where the tramp oil is removed and deposited in a suitable container for disposal. However, conventional tube skimmers frequently suffer binding and jamming problems with the tube.

SUMMARY OF THE INVENTION

According to one aspect, apparatus is provided for separating a first fluid from a mixture of fluids in a container. The first fluid is substantially immiscible with respect to one or more of the other fluids in the mixture. The apparatus includes an endless flexible strip of a material that has an affinity for the first fluid and a pair of members for advancing successive portions of the strip sequentially from a position out of contact with the first fluid to a position of contact with the first fluid and again to a position out of contact with the first fluid. The members have cooperating surfaces that positively engage the strip with sufficient force applied to the strip so that movement of the members relative to one another sequentially advances the successive portions of the strip. The apparatus also includes means for maintaining the successive portions of the strip in contact with the first fluid as the successive portions of the strip are sequentially advanced. In accordance with a particular aspect, the pair of members for advancing the successive portions of the strip can comprise circular rotating gears having meshing gear teeth arranged around the circumference of each gear. The cooperating surface of each gear is recessed radially inwardly of the meshing gear teeth toward the axis of rotation of the gear.

According to another aspect, the apparatus includes means for removing from the successive portions of the strip, as the successive portions of the strip are sequentially advanced, the first fluid that has collected on the successive portions of the strip as a result of the contact between the first fluid and the successive portions of the strip. The means for removing the first fluid from the successive portions of the strip is located so that the first fluid is removed prior to the successive portions of the strip coming into contact with the cooperating surfaces of the pair of members for advancing successive portions of the strip.

According to yet another aspect, the apparatus includes means for retaining the first fluid that has been removed from the successive portion of the strip. In a particular aspect, the means for retaining the first fluid can comprise a holding vessel.

According to still another aspect, the apparatus includes means for directing the first fluid that has been removed from the strip from the means for removing the first fluid to the means for retaining the first fluid. According to a particular aspect, the means for directing can comprise an inclined surface for receiving the first fluid removed from the successive portions of the strip and directing the first fluid by gravity downwardly to the holding vessel.

According to a further aspect, the strip comprises a tube having a generally circular cross section. According to a particular aspect, the apparatus can include a scraping annulus through which the successive portions of the strip pass, the scraping annulus having an inside diameter sufficiently small that the first fluid collected on the successive portions of the strip is removed therefrom as the successive portions of the strip pass through the scraping annulus. Additionally, the scraping annulus is generally secured against movement with the strip as a result of the passage of the successive portions of the strip through the scraping annulus. The scraping annulus is located so that the first fluid is removed from the successive portions of the strip prior to the successive portions of the strip coming into contact with the cooperating surfaces of the gears.

According to yet another aspect, the successive portions of the strip are disposed downwardly of the gears when the successive portions of the strip are advanced through the first fluid and the means for maintaining the successive portions of the strip in contact with the first fluid comprises a weighting annulus through which the successive portions of the strip pass. The weighting annulus has sufficient weight to cause the successive portions of the strip to remain in contact with the first fluid in the container.

BRIEF DESCRIPTION OF THE DRAWINGS

The foregoing and other features and advantages of the present invention will become apparent to those skilled in the art upon reading the following description with reference to the accompanying drawings, in which.

DESCRIPTION OF AN EMBODIMENT OF THE INVENTION

Figure 1:
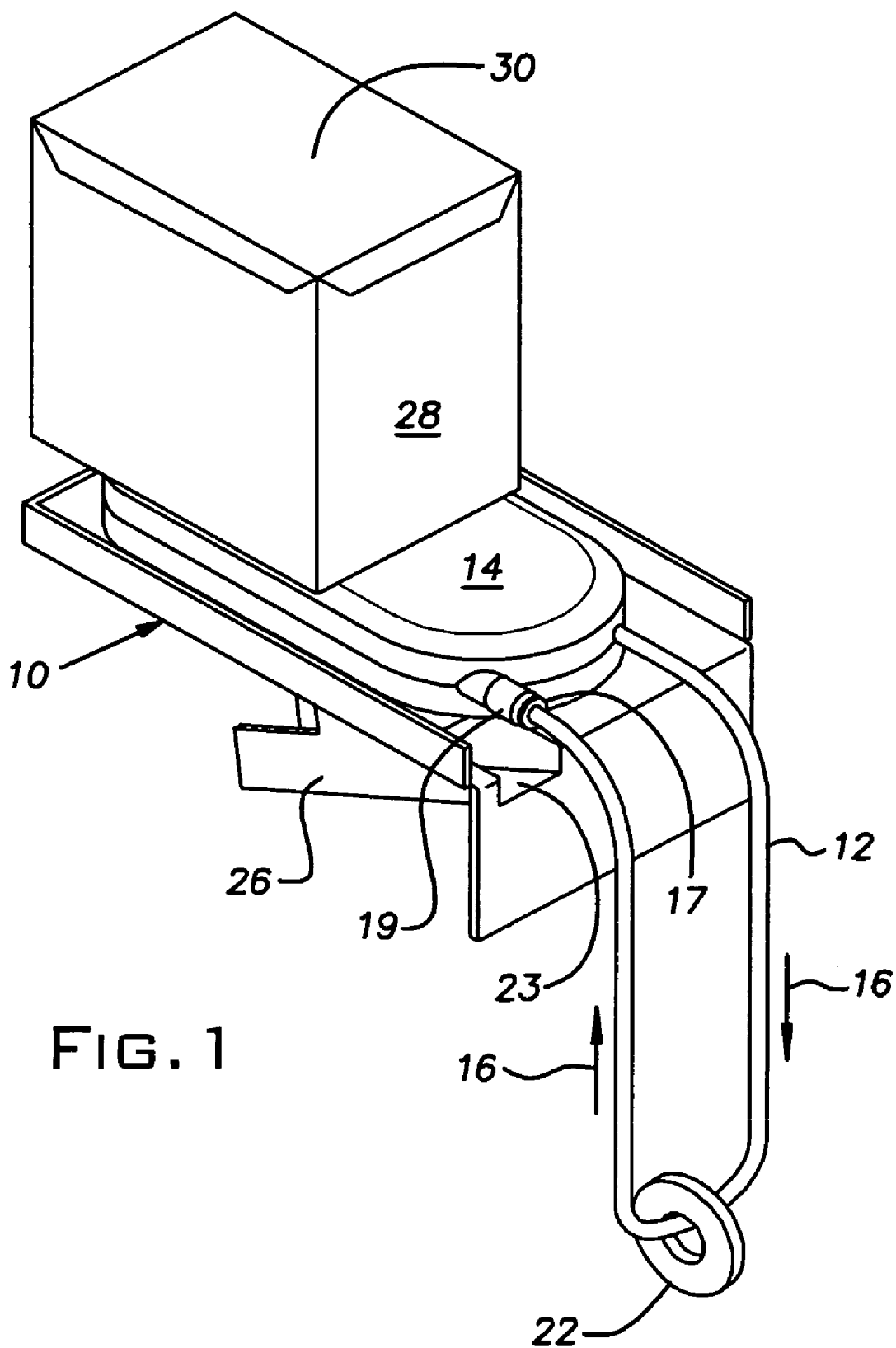
FIG. 1 is a perspective view of an apparatus for separating fluids in accordance with an aspect of the present invention.

For the purposes of facilitating an understanding of the principles of the invention, reference will now be made to the embodiment of the invention depicted in the drawings. However, the invention is not limited in its application to the details of construction or the arrangement of components set forth in the drawings or the following description. Other embodiments of the invention are possible, and the invention is capable of being practiced and carried out in ways other than as described. Also, it is to be understood that the terminology and phraseology used in describing the invention is employed for the purpose of promoting an understanding of the invention and should not be considered as limiting. For example, the phrase "process fluid" should be understood to include not only a coolant used in connection with the cutting and cooling functions of a machining process, but also other fluids such as, for example, a wash fluid, or a metal-working fluid that can collect liquid impurities during the machining process and from which the liquid impurities are to be removed. Additionally, the phrase "tramp oil" is used generally to refer to any fluid that may contaminate the process fluid during the machining process such as, for example, cutting oils, lubricants, way oils, mill oils, hydraulic fluids, and other fluids that are not miscible or soluble in the process fluid. Further, the phrase "oily process fluid" is used generally herein to refer to a process fluid having a high concentration of a tramp oil.

Turning to the drawings, there is shown in FIG. 1 an apparatus for separating a first fluid from a mixture of fluids. The illustrated apparatus comprises a tube skimmer that incorporates the features of the present invention. The tube skimmer of the illustrated embodiment includes a support platform 10 which can be mounted to a process fluid tank, or container (not shown), in which the mixture of fluids is held or any other suitable structure adjacent the process fluid tank. In a machining operation, the process fluid tank typically contains a process fluid, such as a coolant, and a tramp oil that is substantially immiscible with respect to and floats on top of the coolant. It will be understood that the apparatus of the invention is not limited to use in separating a tramp oil from a coolant in a machining operation but has general application to circumstances where a first fluid is separated from a mixture of fluids in a container, the first fluid being substantially immiscible with the one or more other fluids in the mixture.

The tube skimmer also includes an endless flexible strip of a material that has an affinity for the first fluid in the mixture of fluids such as the tramp oil. In the illustrated embodiment, the flexible strip of material comprises a tube 12 having a generally circular cross section and made of a material such as a pliable polyethylene, successive portions of which are continuously advanced through a gearbox, or housing, 14 in a direction indicated by the arrows 16. Successive portions of the tube 12 are advanced into the gearbox 14 through an inlet 18 and out of the gearbox 14 through an outlet 20. The flexible strip 12 can be of any suitable length and diameter. The flexible strip of material need not comprise a tube or be circular in cross-section. For example, the strip can be made of a solid material and have a rectangular or square cross-section. Additionally, the strip can be made of a material other than polyethylene so long as the material has an affinity for the fluid that is being separated. Further details regarding the manner in which successive portions of the tube 12 are advanced through the gearbox 14 are set forth below.

The apparatus of the invention further includes means for maintaining the successive portions of the tube 12 in contact with the tramp oil as successive portions of the tube are sequentially advanced through the gearbox 14 and the tramp oil. As best shown in FIG. 1, the successive portions of the tube 12 are disposed downwardly of the gearbox 14. In the embodiment of the invention illustrated in the drawings, the means for maintaining the successive portions of the tube 12 in contact with the tramp oil comprises a generally ring-shaped weight, or weighting annulus 22 that is located on the tube 12 such that the tube 12 passes through the inner diameter of the weighting annulus. The weighting annulus 22 is properly sized to have sufficient weight so as to cause the successive portions of the tube 12, as they are advanced, to remain in contact with the tramp oil. It is to be appreciated that any suitable type of weighting element can be employed to maintain the tube 12 in contact with the tramp oil and the weighting element need not be in the shape an annulus or ring. Further, as an alternative, the means for maintaining the successive portions of the tube 12 in contact with the tramp oil can comprise a float formed of a buoyant material properly sized to have sufficient buoyancy so as to suspend successive portions of the tube 12 at or near the surface of the tramp oil located in the process fluid tank. As a result, successive portions of the tube 12, as they are advanced, will remain in contact with the tramp oil. When the tube 12 contacts the oily process fluid in the process fluid tank, because the tube has an affinity for the tramp oil, the tramp oil from the oily process fluid is attracted to the tube 12 and, thus, collects onto the surface of the tube 12.

The apparatus of the invention also includes means for removing from the successive portions of the tube 12, as the successive portions of the tube are sequentially advanced, tramp oil that has collected on successive portions of the tube as a result of the contact between the tramp oil and the successive portions of the tube. This means for removing tramp oil in the embodiment of the invention shown in the drawings comprises a scraper 17 that is provided outside the inlet 18 of the gearbox 14. As successive portions of the tube 12 are sequentially advanced, the tramp oil that has collected on the tubing, as a result of the contact between the tramp oil and the tubing, is removed. The scraper 17 is located so that the tramp oil is removed from the successive portions of the tube 12 prior to the tube 12 advancing through the gearbox 14 and coming into contact with the components within the gearbox. The scraper 17 comprises a generally ring-shaped structure, or scraping annulus, which substantially surrounds and engages the exterior peripheral surface of the tube 12 so as to strip the tramp oil from the peripheral surface of the tube 12 as the successive portions of the tube 12 advance through the scraping annulus 17 and into the gearbox 14. Thus the inside diameter of the scraping annulus 17 is sufficiently small that the tramp oil collected on successive portions of the tube 12 is scraped and removed therefrom as the successive portions of the tube pass through the scraping annulus. The scraping annulus 17, preferably, engages the tube 12 at a location in which the tube 12 is substantially horizontally positioned (e.g., adjacent to the inlet of the gearbox 14) so that tramp oil stripped from the tube 12 can be received by a means for directing the tramp oil that has been removed from the tube 12 from the scraping annulus 17 to a means for retaining the tramp oil that has been so removed, such as a tramp oil holding vessel, or storage tank, (not shown) by gravity. The scraping annulus 17 is formed from a suitable material which is resistant to damage from oil such as, for example, ceramic or stainless steel. The scraping annulus 17 abuts a cap 19 that is placed around the inlet 18 of the housing 14. Consequently, the scraping annulus is generally secured against movement with the tube 12 as a result of the passage of the successive portions of the tube through the scraping annulus and is able to perform its scraping function.

The means for directing tramp oil removed from the tube 12 comprises, in the illustrated embodiment of the invention, a tramp oil drain 26 located under the scraper 18 to receive the tramp oil removed from the tube 12. The tramp oil drain 26 is in fluid communication with the tramp oil storage tank, or holding vessel, (not shown) by means of the inclined surface 23 so that tramp oil removed from the successive portions of the tube 12 is directed by the inclined surface 23 by gravity downwardly to the holding vessel. The tramp oil drain 26, as well as the tramp oil storage tank, is formed from a suitable material which is resistant to damage from the oil such as, for example, stainless steel. As illustrated in FIG. 1, the tramp oil drain 26 can be incorporated into the support platform 10. Alternatively, the tramp oil drain 26 can be provided as a separate structure.

The tube skimmer of the invention further includes a motor housing 28 that houses a motor (not shown). The motor housing 28 has a removable cover 30 to facilitate access to the motor within the housing. The motor includes a drive shaft that drives components of the skimmer that are contained within housing 14, as described below, so as to advance successive portions of the tube 12 for the purpose of picking up tramp oil from the surface of the coolant, as the successive portions of the tube 12 advance, and transporting the tramp oil to the scraping annulus 17. Although the tube skimmer is depicted as providing one direction of advancement for the tube 12, it is to be appreciated that a reversible motor can be employed so that the tube 12 can be advanced in either direction. In that case, the tube skimmer can be provided with an additional scraping annulus at the outlet 20 of the gearbox 14 to remove tramp oil from successive portions of the tube 12 prior to the tube entering the gearbox 14. Also in that instance, a tramp oil drain would be located beneath outlet 20.

Figure 2:
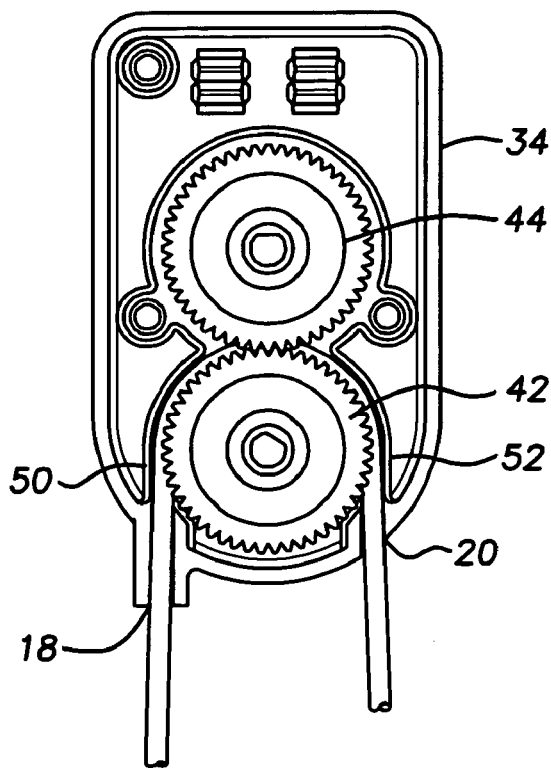
FIG. 2 is a top view of certain components of the apparatus of FIG. 1.
Figure 3:
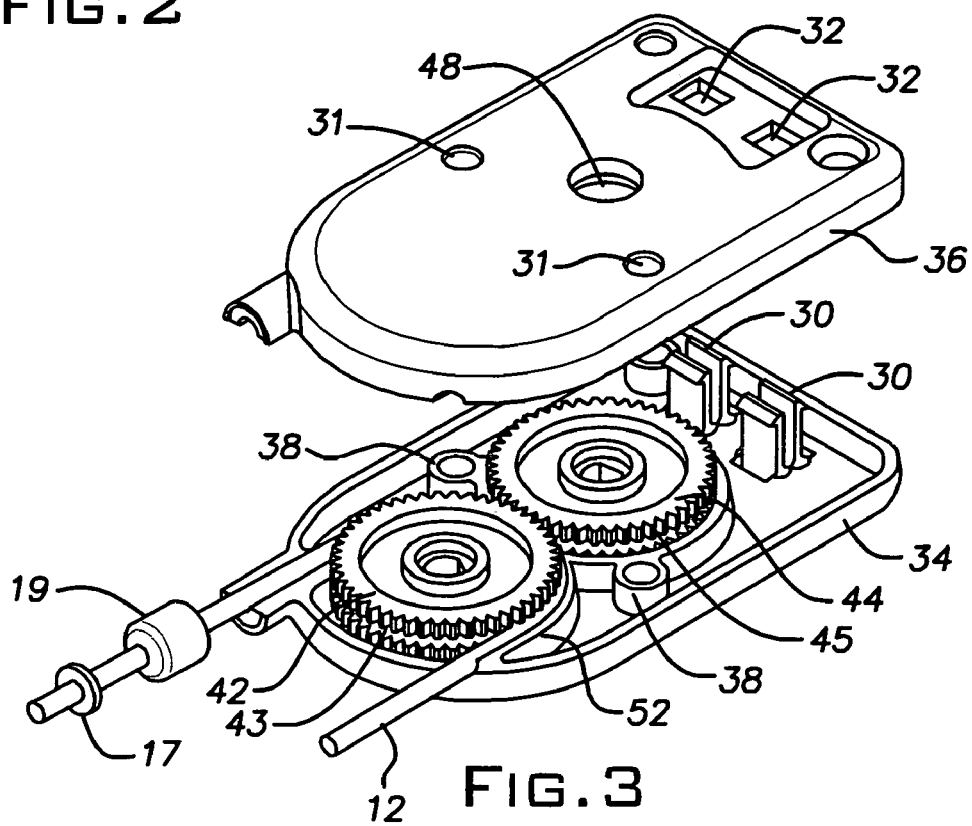
FIG. 3 is an exploded perspective view of certain components of the apparatus of FIG. 1, including the components illustrated in FIG. 2.

Turning now to FIGS. 2 and 3, the gearbox 14 and the components of the tube skimmer contained therein are shown in further detail. The gearbox 14 includes a lower housing portion 34 and an upper housing portion 36. The lower housing portion 34 is provided with clips 30, and the upper housing portion 36 has corresponding apertures 32 through which the clips 30 extend for securing the lower and upper housing portions together. The lower and upper housing portions can additionally be secured together by fasteners that extend through the openings 31 in the upper housing portion and are fastened to the lugs 38 provided in the lower housing portion 34. The fasteners can comprise screws that are fastened to threaded cavities in the lugs 38.

Contained within the gearbox 14 are a pair of members for advancing successive portions of the tube 12 sequentially from a position out of contact with the tramp oil to a position of contact with the tramp oil and again to a position out of contact with the tramp oil. The pair of members have cooperating surfaces that positively engage the tube 12 with sufficient force applied to the tube so that movement of the pair of members relative to. one another sequentially advances successive portions of the tube. Specifically, the lower housing portion 34 includes a gearing mechanism in the form of a pair of circular, rotating gears 42 and 44 having meshing gear teeth arranged around the circumference of each gear. Rotation of the gears advances successive portions of the tube 12 through the gearbox 14 and the tramp oil that floats on the surface of the coolant. The gearbox 14 receives the drive shaft of the motor in the motor housing 28 that drives the gears 42 and 44. The drive shaft enters housing 14 through an aperture 48 in the top housing portion 36 and is secured to the gear 44, although the drive shaft may alternately be secured to gear 42. The gears 42 and 44 rotate in opposite directions: gear 42 rotates clockwise when viewed from the top, as in FIG. 2, while gear 44 rotates counterclockwise when viewed from the top. Such opposite rotation between the gears 42 and 44 creates a pinch point between the gears that acts to advance successive portions of the tube 12 through the pinch point. The top housing portion 36 provides a protective cover for the gearbox components to protect not only the components, but also to afford a level of safety for the operators.

Figure 4:
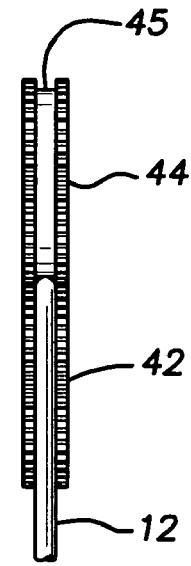
FIG. 4 is an end view of the gearing mechanism shown in FIGS. 2 and 3, illustrating the manner in which the endless tubular member is arranged with respect to the gearing mechanism for advancement of the endless tubular member by the gearing mechanism In the drawings, the same reference numerals are used to designate the same elements in the figures in order to facilitate the description of the invention and certain features and components may be shown in a somewhat schematic form

As best shown in FIG. 4, the gears 42 and 44 have cooperating surfaces 43 and 45, respectively, that are recessed radially inwardly of the meshing gear teeth toward the axis of rotation of a respective gear and positively engage the tube 12 with sufficient force applied to the tube 12 so that movement of the gears relative to one another sequentially advances successive portions of the tube. This positive engagement creates the pinch point referred to above. Although not required, each of the cooperating surfaces 43 and 45 of the gears 42 and 44, respectively, can have a concave configuration that is generally complementary with the circular cross section of the tube. The gear configuration of the present invention, by creating a pinch point to increase tube drive grip, mitigates the tube binding and jamming experienced with conventional tube skimming apparatuses.

Turning back to FIGS. 2 and 3, the gearbox 14 also includes guides 50 and 52, to assist in guiding the tube 12 through the gearbox 14. An inlet guide 50 is provided in the lower housing 34 to facilitate directing the tube 12 around a first portion of the first gear 42 within recess 43 and to the pinch point. A discharge tube guide 52 is provided in the lower housing portion 34 to facilitate directing the tube 12 out of the pinch point and around a second portion of the first gear 42 within recess 43. The inlet tube guide 50 and the discharge tube guide 52 are configured such that the tube 12, while moving through the gearbox 14, is in substantially continuous contact with one of the inlet tube guide 50, the pinch point, or the discharge tube guide 52.

From the above description of the invention, those skilled in the art will perceive improvements, changes and modifications. Such improvements, changes and modifications are intended to be included within the scope of the description of the present invention and the claims that follow.

What is claimed is:

1. An apparatus for separating a first fluid from a mixture of fluids in a container, the first fluid being substantially immiscible with respect to one or more other fluids in the mixture, the apparatus comprising:

an endless flexible strip of a material having an affinity for the first fluid, the strip comprising a tube having a generally circular cross section;

a pair of members for advancing successive portions of the strip sequentially from a position out of contact with the first fluid, to a position of contact with the first fluid and again to a position out of contact with the first fluid, the members comprising circular rotating gears having meshing gear teeth arranged around the circumference of each gear and having cooperating surfaces of a concave configuration that is generally complementary with the circular cross section of the strip, the cooperating surfaces being recessed radially inwardly of the meshing gear teeth toward the axes of rotation of the gears and positively engaging the strip at a pinch point with sufficient force applied to the strip so that movement of the members relative to one another sequentially advances successive portions of the strip;

means for removing from the successive portions of the strip as the successive portions of the strip are sequentially advanced the first fluid that has collected on the successive portions of the strip as a result of the contact between the first fluid and the successive portions of the strip, said means for removing the first fluid from the successive portions of the strip being located so that the first fluid is removed prior to the successive portions of the strip coming into contact with the cooperating surfaces on the pair of members for advancing successive portions of the strips; and means for maintaining the successive portions of the strip in contact with the first fluid as the successive portions of the strip are sequentially advanced.

2. The apparatus of claim 1 including means for retaining the first fluid that has been removed from the successive portions of the strip.

3. The apparatus of claim 2 including means for directing the first fluid that has been removed from the strip from the means for removing the first fluid to the means for retaining the first fluid.

4. The apparatus of claim 1 wherein the means for removing the first fluid that has collected on the strip comprises a scraping annulus through which the successive portions of the strip pass, the scraping annulus being generally secured against movement with the strip as could occur by the passage of the successive portions of the strip therethrough and having an inside diameter sufficiently small that the first fluid collected on the successive portions of the strip is removed therefrom as the successive portions of the strip pass through the scraping annulus, the scraping annulus being located such that the first fluid is removed from the successive portions of the strip prior to the successive portions of the strip coming into contact with the cooperating surfaces of the gears.

5. The apparatus of claim 4 including a holding vessel for retaining the first fluid removed from the successive portions of the strip.

6. The apparatus of claim 5 including an inclined surface for receiving the first fluid removed from the successive portions of the strip and directing the first fluid by gravity downwardly to the holding vessel.

7. The apparatus of claim 6 wherein the successive portions of the strip are disposed downwardly of the gears when the successive portions of the strip are advanced through the first fluid and the means for maintaining the successive portions of the strip in contact with the first fluid comprises a weighting annulus through which the successive portions of the strip pass, the weighting annulus having a sufficient weight to cause the successive portions of the strip to remain in contact with the first fluid in the container.

* * * * *